US012235848B2

(12) United States Patent
Wu et al.

(10) Patent No.: US 12,235,848 B2
(45) Date of Patent: Feb. 25, 2025

(54) METHOD AND SYSTEM FOR SOLVING SUBSET SUM MATCHING PROBLEM USING SEARCH APPROACH

(71) Applicant: JPMorgan Chase Bank, N.A., New York, NY (US)

(72) Inventors: Yufei Wu, London (GB); Parisa Zehtabi, London (GB); Alberto Pozanco, Madrid (ES); Daniel Borrajo, Pozuelo de Alarcon (ES); Daniele Magazzeni, London (GB); Manuela Veloso, New York, NY (US); Michael Cashmore, Stirlingshire (GB); Jie Deng, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/208,603

(22) Filed: Jun. 12, 2023

(65) Prior Publication Data
US 2024/0411762 A1    Dec. 12, 2024

(51) Int. Cl.
*G06F 16/2455*    (2019.01)
*G06F 16/22*    (2019.01)

(52) U.S. Cl.
CPC .... *G06F 16/24557* (2019.01); *G06F 16/2255* (2019.01)

(58) Field of Classification Search
CPC .............. G06F 16/24557; G06F 16/2255
See application file for complete search history.

(56) References Cited

U.S. PATENT DOCUMENTS 8,073,797 B1 * 12/2011 Ruffa ............ G06F 17/11
706/45

* cited by examiner

*Primary Examiner* — Loc Tran
(74) *Attorney, Agent, or Firm* — GREENBLUM & BERSTEIN P.L.C.

(57) ABSTRACT

Methods and systems for performing a combinatorial optimization task are provided. The method includes: receiving a first set of data items and a second set of data items; dividing the second set of data items into a first subset and a second subset; generating, based on the first subset, a first set of subset sums, and storing the first set of subset sums as a list; generating, based on the second subset, a second set of subset sums, and storing the second set of subset sums as a hash-map in conjunction with a corresponding hash function; and detecting, based on the first set of data items, the list, and the hash-map, at least one match between a subset sum that corresponds to the second set of data items and a subset sum that corresponds to the first set of data items.

18 Claims, 10 Drawing Sheets

400

```
┌─────────────────────────────────────────────────────────┐
│ Receive First Set of Data Items that Relate to First Situation │
│                         S402                            │
└─────────────────────────────────────────────────────────┘
                              │
                              ▼
┌─────────────────────────────────────────────────────────┐
│ Receive Second Set of Data Items that Relate to Second Situation │
│                         S404                            │
└─────────────────────────────────────────────────────────┘
                              │
                              ▼
┌─────────────────────────────────────────────────────────┐
│         Divide Second Set of Data Items into Two Subsets         │
│                         S406                            │
└─────────────────────────────────────────────────────────┘
                              │
                              ▼
┌─────────────────────────────────────────────────────────┐
│         Generate First Set of Subset Sums and Store as List      │
│                         S408                            │
└─────────────────────────────────────────────────────────┘
                              │
                              ▼
┌─────────────────────────────────────────────────────────┐
│     Generate Second Set of Subset Sums and Store as Hash-        │
│                   Map with Hash Function                         │
│                         S410                            │
└─────────────────────────────────────────────────────────┘
                              │
                              ▼
┌─────────────────────────────────────────────────────────┐
│   Use First Set of Data Items, List, and Hash-Map to Detect      │
│                    Subset Sum Matches                            │
│                         S412                            │
└─────────────────────────────────────────────────────────┘
                              │
                              ▼
┌─────────────────────────────────────────────────────────┐
│                  Validate Detected Matches                       │
│                         S414                            │
└─────────────────────────────────────────────────────────┘
```

SSMP
(a, b, ε)

| a | | | | b | | | | | ε |
|---|---|---|---|---|---|---|---|---|---|
| -3.1 | 5.4 | 4.3 | 2.8 | 1.1 | 2.8 | -4.3 | 1.5 | 2.7 | 0.1 |

Algorithm 1 Sub-optimal Solver for SSMP
Input: SSMP$(a,b,\epsilon)$
Output: $s$
1: $s \leftarrow \emptyset$, finish $\leftarrow$ *false*
2: while not(finish) do
3: $s^- \leftarrow$ Solve(SSMP$^-(a,b,\epsilon)$)
4: if $s^- = \emptyset$ then
5: finish $\leftarrow$ *true*
6:     else
7: $s \leftarrow s \cup s^-$
8: $a \leftarrow a_{/s^-}$ and $b \leftarrow b_{/s^-}$
9:     end if
10: end while
11: return $s$

Algorithm 2 Search Solver for SSMP
Input: SSMP-$(a,b,\epsilon)$
Output: $s^-$

1: Generate C, D based on $b$
2: for each $w \in \{0,1\}^M \setminus 0$, each $(c,v') \in C$ do
3: Collect target key values K
4: for each $(d,v'')$ with $\kappa \to (d,v'') \in D, \kappa \in K$ do
5: if $\langle a_w, b_{v \oplus v'} \rangle$ is a valid *match* then
6:    return $s^- \leftarrow \{\langle a_w, b_{v \oplus v'} \rangle\}$
7: end if
8:      end for
9: end for
10: return $s^- \leftarrow \emptyset$

FIG. 7

800
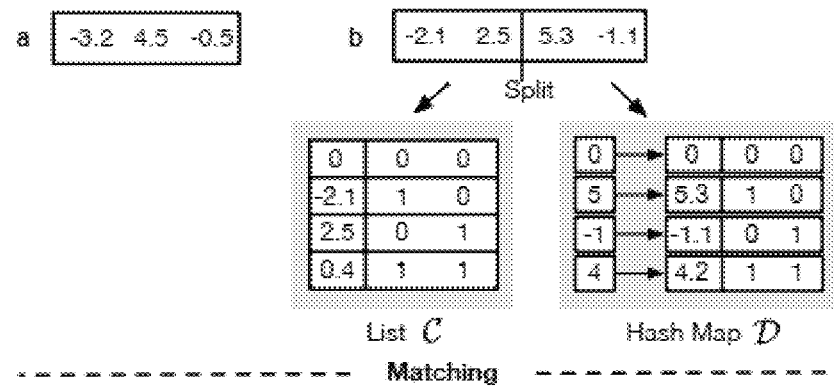
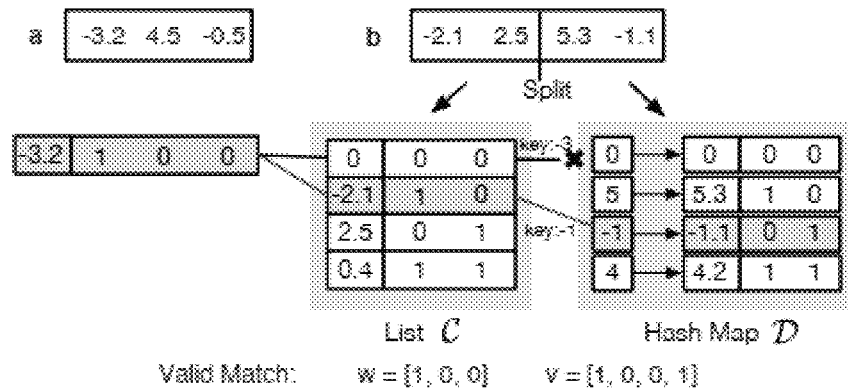
FIG. 8

900

Algorithm 3 Dynamic Programming Solver for SSMP$^-$

Input: SSMP$^-$($a,b,\epsilon$)

Output: $s^-$

1: Form SSMP$^-$($\eta,\lambda,\epsilon^-$) with discretisation & reorganisation
2: Build and update tables $T_\eta$, $T_\lambda$
3: for $0 \leq e \leq \epsilon^-$ do
4: Find matched integer sums $H_e$ from $T_\eta$, $T_\lambda$
5: for each $(i,j) \in H_e$ do
6: Collect qualified subsets from tree search:
$$J = \{\eta_p : \eta \cdot p = i\}, \Lambda = \{\lambda_q : \eta \cdot q = j\}$$
7: for $\eta_p \in J, \lambda_q \in \Lambda$ do
8:     Recover $\langle a_w, b_v \rangle$ from $\langle \eta_p, \lambda_q \rangle$
9:     if $\langle a_w, b_v \rangle$ is a valid *match* then
10:     return $s^- \leftarrow \{\langle a_w, b_v \rangle\}$
11: end if
12: end for
13:     end for
14: end for
15: return $s^- \leftarrow \emptyset$

FIG. 9

METHOD AND SYSTEM FOR SOLVING SUBSET SUM MATCHING PROBLEM USING SEARCH APPROACH

CROSS-REFERENCE TO RELATED APPLICATIONS

"This application is being filed concurrently on Jun. 12-th, 2023 with U.S. patent application Ser. No. 18/208,608, entitled "Method and System for Solving Subset Sum Matching Problem Using Dynamic Programming Approach"; the contents of which are hereby incorporated by reference in its entirety."

BACKGROUND

1. Field of the Disclosure

This technology generally relates to methods and systems for performing a combinatorial optimization task that relates to finding subsets of matching sums of items that are associated with two parties in an efficient and cost-effective manner.

2. Background Information

Combinatorial Optimization (CO) problems aim to find optimal configuration over a discrete domain of possibilities. Conventional optimization tasks related to subsets, such as, for example, the maximum cut problem, the minimum vertex cover problem, and/or the maximum independent set problem, usually focus on finding an optimal partition of a given set. Some others, such as, for example, the subset sum problem and the knapsack problem, aim to find subsets matching a predetermined target. Matching tasks across two parties like the generalized assignment problem try to find more than one match where each match contains only one element from both sets.

Most of these approaches also include in their definition a given function that checks whether a match is valid. For instance, in the subset sum problem, a match is valid when the sum of the values of the elements on one side is equal to a given target value.

The general CO problem with respect to subsets has many applications in the context of tasks assignment, i.e., matching a set of tasks to a set of workers given some skills constraints. There are also many real-world applications in the financial industry. In particular, it appears intensively in an accounting process known as reconciliation, where two sets of financial records need to be compared to ensure they are numerically accurate and in agreement with each other. Some level of netting differences might be accepted and explained due to when payments and deposits are processed. Reconciliation tasks, e.g. bank, inter-company or customer reconciliations, are labor intensive, and are essential for helping businesses and individuals to confirm that accounts are consistent and complete. They are also fundamental to detect potential fraudulent activities or bank mistakes via discovering discrepancies between two financial records or account balances.

Finding a group of matched items from multiple parties potentially requires exploration of all possible combinations and determining whether a certain combination is a valid match. However, the time cost for this brute-force approach grows exponentially and quickly becomes intractable as the number of items increases.

Accordingly, there is a need for a method for performing a combinatorial optimization task that relates to finding subsets of matching sums of items that are associated with two parties in an efficient and cost-effective manner.

SUMMARY

The present disclosure, through one or more of its various aspects, embodiments, and/or specific features or sub-components, provides, inter alia, various systems, servers, devices, methods, media, programs, and platforms for methods and systems for performing a combinatorial optimization task that relates to finding subsets of matching sums of items that are associated with two parties in an efficient and cost-effective manner.

According to an aspect of the present disclosure, a method for performing a combinatorial optimization task that relates to finding matching subsets among items that are associated with two parties is provided. The method is implemented by at least one processor. The method includes: receiving, by the at least one processor, a first set of data items that relate to respective characteristics of a first situation; receiving, by the at least one processor, a second set of data items that relate to respective characteristics of a second situation, a number of items included in the second set of data items being at least as great as a number of items included in the first set of data items; dividing, by the at least one processor, the second set of data items into a first subset and a second subset; generating, by the at least one processor based on the first subset, a first set of subset sums, and storing the first set of subset sums as a list; generating, by the at least one processor based on the second subset, a second set of subset sums, and storing the second set of subset sums as a hash-map in conjunction with a corresponding hash function; and detecting, by the at least one processor based on the first set of data items, the list, and the hash-map, at least one match between a subset sum that corresponds to the second set of data items and a subset sum that corresponds to the first set of data items.

The method may further include selecting a value for a matching threshold. The detecting of the at least one match may include determining whether a difference between the subset sum that corresponds to the second set of data items and the subset sum that corresponds to the first set of data items is less than the selected value for the matching threshold.

The method may further include validating the detected at least one match.

The dividing may include: selecting a natural number between zero and the number of items included in the second set of data items as a split point; and dividing the second set of data items into the first subset and the second subset such that a vector concatenation of the first subset with the second subset is equal to the selected split point.

A number of elements of the first set of subset sums stored as the list may be equal to two raised to a power that is equal to the selected split point.

A number of elements of the second set of subset sums stored as the hash-map may be equal to two raised to a power that is equal to a difference between the number of items included in the second set of data items and the selected split point.

The detecting may include applying a search algorithm that determines at least one element of the second set of subset sums as satisfying a predetermined equation, identifies a set of keys that corresponds to the determined at least one element, and searches the hash-map for the identified set of keys. The at least one match may be generated as an output of the search algorithm.

The first situation may relate to a first set of records that is associated with a first party from among the two parties. The second situation may relate to a second set of records that is associated with a second party from among the two parties.

According to another exemplary embodiment, a computing apparatus for performing a combinatorial optimization task that relates to finding matching subsets among items that are associated with two parties is provided. The computing apparatus includes a processor; a memory; and a communication interface coupled to each of the processor and the memory. The processor is configured to: receive, via the communication interface, a first set of data items that relate to respective characteristics of a first situation; receive, via the communication interface, a second set of data items that relate to respective characteristics of a second situation, a number of items included in the second set of data items being at least as great as a number of items included in the first set of data items; divide the second set of data items into a first subset and a second subset; generate, based on the first subset, a first set of subset sums, and store the first set of subset sums in the memory as a list; generate, based on the second subset, a second set of subset sums, and store the second set of subset sums in the memory as a hash-map in conjunction with a corresponding hash function; and detect, based on the first set of data items, the list, and the hash-map, at least one match between a subset sum that corresponds to the second set of data items and a subset sum that corresponds to the first set of data items.

The processor may be further configured to select a value for a matching threshold, and to detect the at least one match by determining whether a difference between the subset sum that corresponds to the second set of data items and the subset sum that corresponds to the first set of data items is less than the selected value for the matching threshold.

The processor may be further configured to validate the detected at least one match.

The processor may be further configured to divide the second set of data items by: selecting a natural number between zero and the number of items included in the second set of data items as a split point; and dividing the second set of data items into the first subset and the second subset such that a vector concatenation of the first subset with the second subset is equal to the selected split point.

A number of elements of the first set of subset sums stored as the list may be equal to two raised to a power that is equal to the selected split point.

A number of elements of the second set of subset sums stored as the hash-map may be equal to two raised to a power that is equal to a difference between the number of items included in the second set of data items and the selected split point.

The processor may be further configured to detect the at least one match by applying a search algorithm that determines at least one element of the second set of subset sums as satisfying a predetermined equation, identifies a set of keys that corresponds to the determined at least one element, and searches the hash-map for the identified set of keys. The at least one match may be generated as an output of the search algorithm.

The first situation may relate to a first set of records that is associated with a first party from among the two parties, and the second situation relates to a second set of records that is associated with a second party from among the two parties.

According to yet another exemplary embodiment, a non-transitory computer readable storage medium storing instructions for performing a combinatorial optimization task that relates to finding matching subsets among items that are associated with two parties is provided. The storage medium includes executable code which, when executed by a processor, causes the processor to: receive a first set of data items that relate to respective characteristics of a first situation; receive a second set of data items that relate to respective characteristics of a second situation, a number of items included in the second set of data items being at least as great as a number of items included in the first set of data items; divide the second set of data items into a first subset and a second subset; generate, based on the first subset, a first set of subset sums, and store the first set of subset sums as a list; generate, based on the second subset, a second set of subset sums, and store the second set of subset sums as a hash-map in conjunction with a corresponding hash function; and detect, based on the first set of data items, the list, and the hash-map, at least one match between a subset sum that corresponds to the second set of data items and a subset sum that corresponds to the first set of data items.

When executed by the processor, the executable code may further cause the processor to select a value for a matching threshold, and to detect the at least one match by determining whether a difference between the subset sum that corresponds to the second set of data items and the subset sum that corresponds to the first set of data items is less than the selected value for the matching threshold.

When executed by the processor, the executable code may further cause the processor to validate the detected at least one match.

When executed by the processor, the executable code may further cause the processor to divide the second set of data items by: selecting a natural number between zero and the number of items included in the second set of data items as a split point; and dividing the second set of data items into the first subset and the second subset such that a vector concatenation of the first subset with the second subset is equal to the selected split point.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for performing a combinatorial optimization task that relates to finding subsets of matching sums of items that are associated with two parties in an efficient and cost-effective manner.

FIG. 5 is an example of a specific type of subset sum matching problem and a variety of valid solutions, according to an exemplary embodiment.

FIG. 6 is a first algorithm that is usable for implementing a method for performing a combinatorial optimization task that relates to finding subsets of matching sums of items that are associated with two parties in an efficient and cost-effective manner, according to an exemplary embodiment.

FIG. 7 is a second algorithm that is usable for implementing a method for performing a combinatorial optimization task that relates to finding subsets of matching sums of items that are associated with two parties in an efficient and cost-effective manner, according to an exemplary embodiment.

FIG. 8 is an example of how to apply the second algorithm for solving a problem that relates to finding subsets of matching sums of items that are associated with two parties in an efficient and cost-effective manner, according to an exemplary embodiment.

FIG. 9 is a third algorithm that is usable for implementing a method for performing a combinatorial optimization task that relates to finding subsets of matching sums of items that are associated with two parties in an efficient and cost-effective manner, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
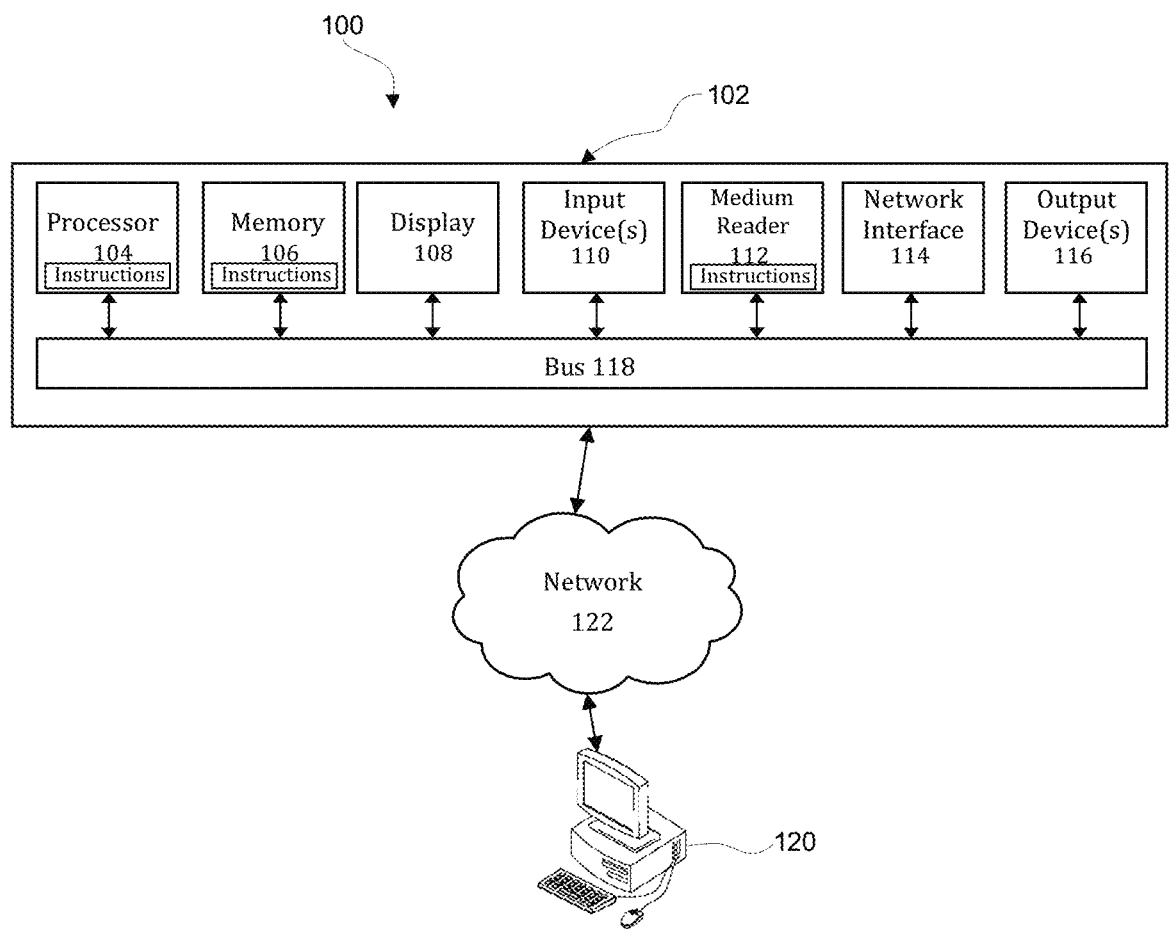
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for performing a combinatorial optimization task that relates to finding subsets of matching sums of items that are associated with two parties in an efficient and cost-effective manner.

Figure 2:
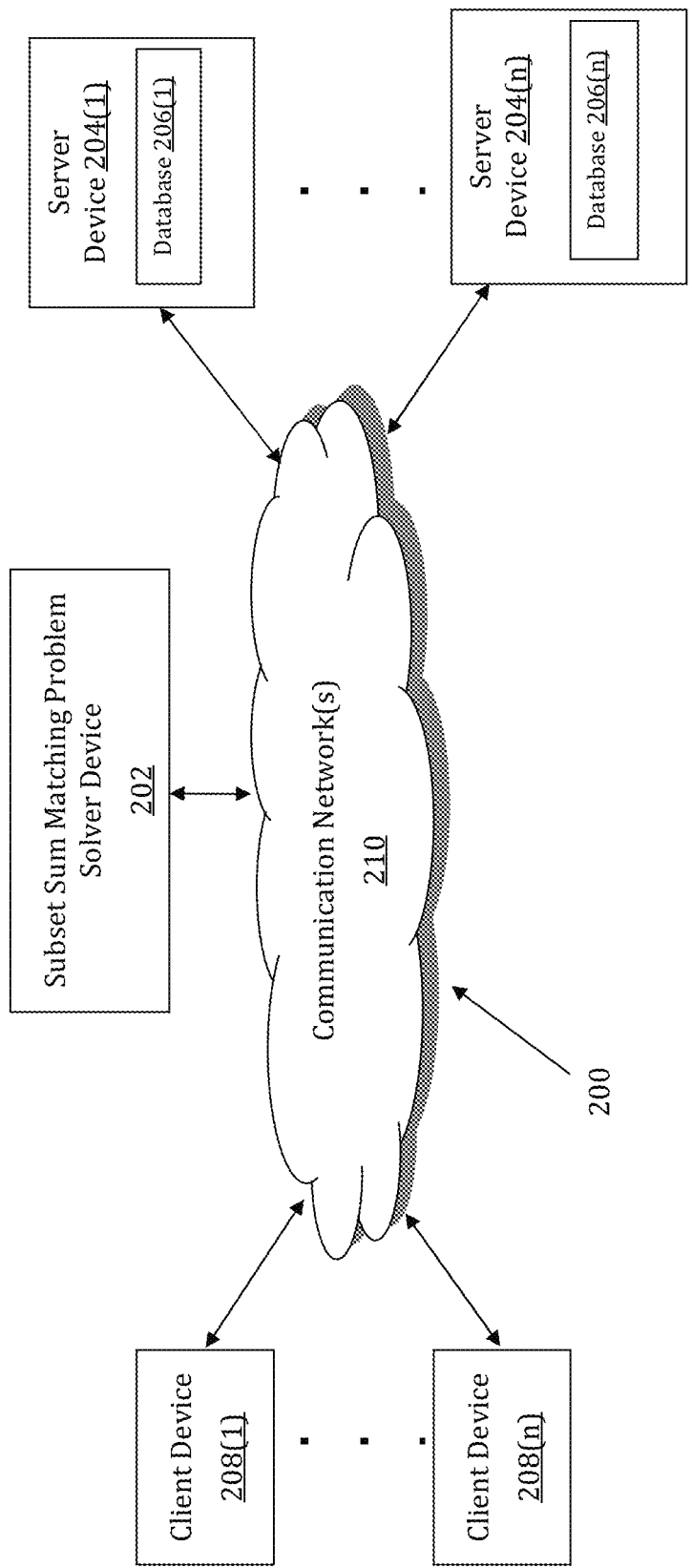
FIG. 2 illustrates an exemplary diagram of a network environment.

Referring to FIG. 2, a schematic of an exemplary network environment 200 for implementing a method for performing a combinatorial optimization task that relates to finding subsets of matching sums of items that are associated with two parties in an efficient and cost-effective manner is illustrated. In an exemplary embodiment, the method is executable on any networked computer platform, such as, for example, a personal computer (PC).

The method for performing a combinatorial optimization task that relates to finding subsets of matching sums of items that are associated with two parties in an efficient and cost-effective manner may be implemented by a Subset Sum Matching Problem Solver (SSMPS) device 202. The SSMPS device 202 may be the same or similar to the computer system 102 as described with respect to FIG. 1. The SSMPS device 202 may store one or more applications that can include executable instructions that, when executed by the SSMPS device 202, cause the SSMPS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSMPS device 202 itself, may be located in virtual server(s) running in a cloud-based computing environment rather than being tied to one or more specific physical network computing devices. Also, the application(s) may be running in one or more virtual machines (VMs) executing on the SSMPS device 202. Additionally, in one or more embodiments of this technology, virtual machine(s) running on the SSMPS device 202 may be managed or supervised by a hypervisor.

In the network environment 200 of FIG. 2, the SSMPS device 202 is coupled to a plurality of server devices 204(1)-204(n) that hosts a plurality of databases 206(1)-206(n), and also to a plurality of client devices 208(1)-208(n) via communication network(s) 210. A communication interface of the SSMPS device 202, such as the network interface 114 of the computer system 102 of FIG. 1, operatively couples and communicates between the SSMPS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSMPS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SSMPS devices that efficiently implement a method for performing a combinatorial optimization task that relates to finding subsets of matching sums of items that are associated with two parties in an efficient and cost-effective manner.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SSMPS device 202 may be a standalone device or integrated with one or more other devices or apparatuses, such as one or more of the server devices 204(1)-204(n), for example. In one particular example, the SSMPS device 202 may include or be hosted by one of the server devices 204(1)-204(n), and other arrangements are also possible. Moreover, one or more of the devices of the SSMPS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSMPS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to algorithm-specific parameters and information that relates to metrics for performance and efficiency of the algorithms in solving a problem that relates to finding subsets of matching sums of items that are associated with two parties.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SSMPS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SSMPS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SSMPS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SSMPS device 202, the server devices 204(1)-204(n), or the client devices 208(1)-208(n), for example, may be configured to operate as virtual instances on the same physical machine. In other words, one or more of the SSMPS device 202, the server devices 204(1)-204(n), or the client devices 208(1)-208(n) may operate on the same physical device rather than as separate devices communicating through communication network(s) 210. Additionally, there may be more or fewer SSMPS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
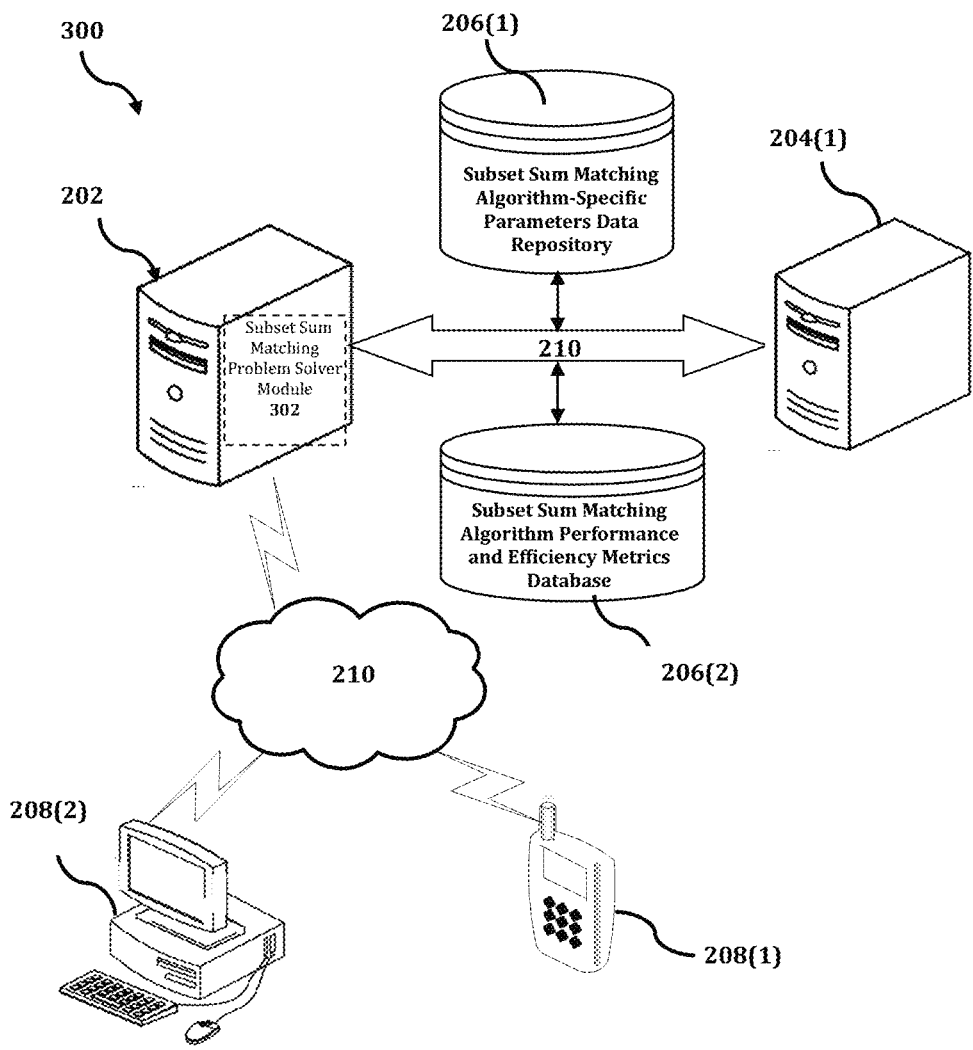
FIG. 3 shows an exemplary system for implementing a method for performing a combinatorial optimization task that relates to finding subsets of matching sums of items that are associated with two parties in an efficient and cost-effective manner.

The SSMPS device 202 is described and illustrated in FIG. 3 as including a subset sum matching problem solver module 302, although it may include other rules, policies, modules, databases, or applications, for example. As will be described below, the subset sum matching problem solver module 302 is configured to implement a method for performing a combinatorial optimization task that relates to finding subsets of matching sums of items that are associated with two parties in an efficient and cost-effective manner.

An exemplary process 300 for implementing a mechanism for performing a combinatorial optimization task that relates to finding subsets of matching sums of items that are associated with two parties in an efficient and cost-effective manner by utilizing the network environment of FIG. 2 is illustrated as being executed in FIG. 3. Specifically, a first client device 208(1) and a second client device 208(2) are illustrated as being in communication with SSMPS device 202. In this regard, the first client device 208(1) and the second client device 208(2) may be "clients" of the SSMPS device 202 and are described herein as such. Nevertheless, it is to be known and understood that the first client device 208(1) and/or the second client device 208(2) need not necessarily be "clients" of the SSMPS device 202, or any entity described in association therewith herein. Any additional or alternative relationship may exist between either or both of the first client device 208(1) and the second client device 208(2) and the SSMPS device 202, or no relationship may exist.

Further, SSMPS device 202 is illustrated as being able to access a subset sum matching algorithm-specific parameters data repository 206(1) and a subset sum matching algorithm performance and efficiency metrics database 206(2). The subset sum matching problem solver module 302 may be configured to access these databases for implementing a method for performing a combinatorial optimization task that relates to finding subsets of matching sums of items that are associated with two parties in an efficient and cost-effective manner.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SSMPS device 202 via broadband or cellular communication. Of course, these embodiments are merely exemplary and are not limiting or exhaustive.

Upon being started, the subset sum matching problem solver module 302 executes a process for performing a combinatorial optimization task that relates to finding subsets of matching sums of items that are associated with two parties in an efficient and cost-effective manner. An exemplary process for performing a combinatorial optimization task that relates to finding subsets of matching sums of items that are associated with two parties in an efficient and cost-effective manner is generally indicated at flowchart 400 in FIG. 4.

In process 400 of FIG. 4, at step S402, the subset sum matching problem solver module 302 receives a first set of data items that relate to respective characteristics of a first situation; and at step S404, the subset sum matching problem solver module 302 receives a second set of data items that relate to respective characteristics of a second situation. In an exemplary embodiment, the data items in both sets correspond to numerical values. Each particular situation may relate to a respective set of records, such as, for example, financial records that are associated with a particular party, such as an individual or a business entity.

At step S406, the subset sum matching problem solver module 302 divides the larger one of the two sets of data items into two subsets. In an exemplary embodiment, when the two sets of data items are received, the one that has a lesser number of items may be assigned as being the first set of data items, and the one that has a greater number of items may be assigned as being the second set of data items, and then the second set of data items is divided into two subsets in step S406.

In an exemplary embodiment, the dividing operation may be performed as follows: First, a natural number between zero and the number of items included in the second set of data items is selected as a split point. For example, if the number of items included in the second set of data items is equal to 100, then a number such as 35, 40, 48, 50, 57, or 64 may be as the split point. Then, the second set of data items is divided into a first subset and a second subset in a manner such that a vector concatenation of the first subset with the second subset is equal to the selected split point.

At step S408, the subset sum matching problem solver module 302 uses the first subset to generate a first set of subset sums, and then stores this first set of subset sums as a list. Then, at step S410, the subset sum matching problem solver module 302 uses the second subset to generate a second set of subset sums, and then stores this second set of subset sums as a hash-map in conjunction with a hash function. In an exemplary embodiment, when the number of items included in the second set of data items is equal to N, and when the number of items included in the first subset is x, then the number of elements in the list will be equal to two raised to the power of x, i.e., $2^x$, and the number of elements in the hash-map will be equal to two raised to the power of (N−x), i.e., $2^{(N-x)}$.

At step S412, the subset sum matching problem solver module 302 uses the first set of data items (i.e., the set having the lesser number of data items), the list, and the hash-map to detect matches between subset sums that correspond to the second set of data items and subset sums that correspond to the first set of data items. In an exemplary embodiment, this detection operation may be performed by applying a search algorithm that determines at least one element of the second set of subset sums as satisfying a predetermined equation, identifies a respective set of keys that corresponds to each such element, and searches the hash-map for the identified set of keys. In this scenario, a matched pair of subset sums is generated as an output of the search algorithm.

In an exemplary embodiment, the determination of whether a there is a match between subset sums may not require an exact match; instead, a matching threshold may be selected, and then when a difference between a particular pair of subset sums is less than or equal to the matching threshold, then the particular pair of subset sums may be deemed as being a match.

Finally, at step S414, the subset sum matching problem solver module 302 validates the matched pairs of subset sums detected in step S412, in order to ensure that the identified matches are correctly identified as such.

Combinatorial Optimization (CO) problems aim to find an optimal configuration over a discrete domain of possibilities. In an exemplary embodiment, the present disclosure proposes and formulates a new type of combinatorial optimization problem, which targets on finding an optimal group of matched subsets from two parties. This problem is referred to herein as the Subset Matching Problem (SMP). Previous optimization tasks related to subsets, e.g., the maximum cut problem, the minimum vertex cover problem, and/or the maximum independent set problem, usually focusing on finding an optimal partition of a given set. Some others, e.g. the subset sum problem and the knapsack problem, aim to find subsets matching a predetermined target. Matching tasks across two parties like the generalized assignment problem, try to find more than one match where each match contains only one element from both sets. Most of these approaches also include in their definition a given function that checks whether a match is valid. For instance, in the subset sum problem, a match is valid when the sum of the values of the elements on one side is equal to a given target value. Instead, SMIP tries to find a set of multiple subset pairs, without any constraint in the size of the subsets. Also, SMIP is independent of the function used to define the validity of a given match. This function is an input to the task. Finally, as opposed to other tasks computing several matches, SMIP allows some elements to not be part of a match in the solution.

Based on the formulation of SMP, the Subset Sum Matching Problem (SSMP) is introduced. The SSMP is a specific type of SMIP where the validation function focuses on subset sums. FIG. 5 is an example 500 of this type of subset sum matching problem and a variety of valid solutions, according to an exemplary embodiment. There are several characteristics of SSMP: 1) it looks for sets of subset pairs; 2) subsets are drawn from two parties and form a matched pair, while other problems normally have only one party (e.g. one set or graph) or one of the parties only contains one element; 3) each element can either appear in one subset or remain unselected; 4) elements contained in each party are real values, either positive or negative; and 5) the matching criteria requires that the numerical difference is within a tolerance instead of restricting to perfect matching.

While the general SMIP problem have many applications in the context of tasks assignment, i.e., matching a set of tasks to a set of workers given some skills constraints, the present disclosure focuses on formulating and solving the SSMP case. SSMP has many real-world applications in the financial industry. In particular, it appears intensively in an accounting process known as reconciliation, where two sets of records, e.g., financial records, need to be compared to ensure they are numerically accurate and in agreement with each other. Some level of netting differences might be accepted and explained due to when payments and deposits are processed. Reconciliation tasks, e.g. bank, inter-company or customer reconciliations, are labor-intensive, and are essential for helping businesses and individuals to confirm that accounts are consistent and complete. They are also fundamental to detect potential fraudulent activities or bank mistakes via discovering discrepancies between two financial records or account balances.

Subset Matching Problem—Problem Definition: Assume $\alpha \in A^M$, $b \in B^N$ are two ordered lists of items. Subsets of a and b are represented with $\alpha_w$ and $b_v$, where $w \in \{0,1\}^M$, $v \in \{0,1\}^N$ are inclusion vectors indicating inclusion/exclusion of each element in that subset corresponding to ordered lists $\alpha$, b. Let $f: A^M \times B^N \rightarrow \{\text{True, False}\}$ be a function that decides whether a pair of subsets forms a valid match. Hence, a (valid) match is a pair of subsets $(\alpha_w, b_v)$ that satisfies $f(\alpha_w, b_v) = \text{True}$.

The Subset Matching Problem (SMP) aims to find a set of matches with nonoverlapping elements that maximize some metric. Let S be the finite set of feasible solutions to an SMP, each feasible solution $s \in S$ can be expressed as combination of K≥0 matches (s=∅ if K=0):

$$s = \{\langle a_{w,k}, b_{v,k} \rangle\}_{k=1,\ldots,K}$$

where inclusion vectors in all matches do not overlap:

$$\forall\, i, j \in [1, K],\, i/=j,\, w^i \cdot w^j = 0,\, v^i \cdot v^j = 0 \quad \text{(Expression 1)}$$

A SMP is defined as a combinatorial optimization problem SMP($\alpha$,b,$f$,$\Psi$), where $\Psi: S \rightarrow R$ is a measure of the solution quality to be maximized. An optimal solution is:

$$s^* = \arg\max_{s \in S} \Psi(s) \quad \text{(Expression 2)}$$

The complexity of SIP problems is Bell(M+N) where Bell(·) indicates bell numbers.

Corresponding Decision Problem: A definition of SMP⁻($\alpha$,b,$f$) is given as the decision problem corresponding to the SMIP CO problem that checks for the existence of a non-empty solution. The SMP⁻ can be answered with 1) 'yes', by finding (any) one match or 2) 'no', by proving that an empty solution with K=0 is the only feasible solution. The finite set of feasible solutions of the corresponding SMP⁻, marked as S⁻, is a subset of the corresponding S:

$$S^- = \{s^- \in S : |s^-| \leq 1\} \quad \text{(Expression 3)}$$

where |s| is the cardinality of a set. An SMIP is unmatchable if the answer to its corresponding decision problem is 'no' or, equivalently, the only valid solution that can be can found in $S^-$ is $s^-=\emptyset(S^-=\{\emptyset\})$.

The Subset Sum Matching Problem: The Subset Sum Matching Problem (SSMP) is a subtype of SMP, which formalizes a group of real-world problems like reconciliation in the financial domain. In an exemplary embodiment, a formulation of SSMP that derives from the above-described definition of SMIP is provided. In particular, the matching function $f$ is defined as checking whether the differences between the sums of the numbers of each match on the two sides is below a given threshold, given by a parameter $\epsilon$.

$$f_{SSMP}(a_w, b_v, \epsilon) = (|w \cdot a - v \cdot b| \leq \epsilon) \wedge (w, v \neq 0) \quad \text{(Expression 4)}$$

where · is the dot scalar product and 0 represents all-zero vectors. Different measures can be defined to be optimized. In the present disclosure, $\Psi$ is defined as:

$$\Psi_{SSMP}(s) = \sum_{k=1}^{K}\left[\sum_{m=1}^{M} w_m^k + \sum_{n=1}^{N} v_n^k\right] + K \quad \text{(Expression 5)}$$

to encourage solutions to cover more elements with finer-grained matches. Considering Expressions (4) and (5), the following definition is provided:

$$SSMP(a, b, \epsilon) = SMP(a, b, f_{SSMP}, \Psi_{SSMP})$$

Likewise, the corresponding decision problem of SSMP is written as $SSMP^-(\alpha,b,\epsilon)$ which is an NP-complete problem, and the combinatorial optimization problem S SMIP is an NP-optimization problem (NPO).

FIG. 6 is a first algorithm 600 that is usable for implementing a method for performing a combinatorial optimization task that relates to finding subsets of matching sums of items that are associated with two parties in an efficient and cost-effective manner, according to an exemplary embodiment.

Sub-optimal Solutions of SSMPs: A sub-optimal solution of SSMP can be computed by a greedy algorithm that iteratively creates and solves a series of SSMP-tasks with the remaining elements in a and b. As shown in algorithm 600, the union of all $SSMP^-$ solutions, found until the formed $SSMP^-$ returns an empty set, is a local-optimal solution of the original SSMP.

In the following section, the present disclosure describes two algorithms towards the local-optimal solutions for solving $SSMP^-$ based on search and dynamic programming. Both algorithms aim to greedily find a valid solution of $SSMP^-$ which either contains a valid match or it is an empty set. The validation of a potential match $(\alpha_w, b_v)$ is addressed in a post-hoc manner by simply checking whether it obeys Expression 4. If the solution is not valid, the algorithm will continue to find the next solution until one valid solution is discovered or no non-empty solutions can be found.

FIG. 7 is a second algorithm 700 that is usable for implementing a method for performing a combinatorial optimization task that relates to finding subsets of matching sums of items that are associated with two parties in an efficient and cost-effective manner, according to an exemplary embodiment. FIG. 8 is an example 800 of how to apply the second algorithm for solving a problem that relates to finding subsets of matching sums of items that are associated with two parties in an efficient and cost-effective manner, according to an exemplary embodiment.

Search Solver for $SSMP^-$: The search solver applies an exhaustive search due to lack of heuristics for SSMPs. Caching is employed in order to reduce the run-time. The $SSMP^-$ search solver contains two steps: 1) pre-computing subset sums and storing them in memory; and 2) search in memory until a valid match is found. The search solver is shown in algorithm 700, and FIG. 8 is an illustration 800 of the algorithm with an example.

Pre-calculation and Caching: Pre-calculation and caching can avoid repetitively computing the same combinations during the search procedure. Assume N≥M. A split is applied to the longer vector b into two parts b', b" satisfying:

$$b' \oplus b'' = b, |b'| = r \quad \text{(Expression 11)}$$

where $\oplus$ is the vector concatenation and $r \in [0,N]$ is the split point. The corresponding inclusion-exclusion vectors for subsets representing b', and b" are $v' \in \{0,1\}^r$ and $v'' \in \{0,1\}^{N-r}$, without excluding all-zero vectors. Subset sum calculation and caching for these two components are performed in slightly different ways.

First, for all possible $v' \in \{0,1\}^r$, the corresponding subset sum c is calculated and stored in a list C ($|C|=2^r$):

$$C = \{(c, v'): c = v' \cdot b', v' \in \{0, 1\}^r\} \quad \text{(Expression 12)}$$

Second, for all possible $v'' \in \{0,1\}^{N-r}$, a calculation of subset sum d is performed, and the result is stored in a hashmap D with a hash function $h(\cdot)$ ($|D|=2^{N-r}$):

$$D = \{h(d) \to (d, v''): d = v'' \cdot b'', v'' \in \{0, 1\}^{N-r}\} \quad \text{(Expression 13)}$$

Matching: The matching procedure in the search-based approach is described in algorithm 700, which goes through all subsets sums of a and searches for matched values from the subset sums of b. With the help of the pre-calculated subset sums stored, the algorithm iterates each $w \in \{0,1\}^M \setminus 0$ for calculating subset sums of a in run-time while recalling each record (c,v') stored in list C. The search targets (d,v") $\in$ D that can form a match that satisfies (see Expression (4)):

$$d \in [w \cdot a - c - \epsilon, w \cdot a - c + \epsilon] \quad \text{(Expression 14)}$$

Assume the hash function $h(\cdot)$ is non-decreasing. Any target d satisfying Expression (14), if it exists, must be linked to a corresponding set of keys:

$$K = \{\kappa: \kappa \in [h(w \cdot a - c - \epsilon), h(w \cdot a - c + \epsilon)]\} \quad \text{(Expression 15)}$$

The algorithm searches the hash-map for these keys and collects a set of elements:

$$\{(d, v''):\kappa \to (d, v'') \in D, \kappa \in K\} \quad \text{(Expression 16)}$$

Each (d,v"), with given w and (c,v'), leads to a potential match $(\alpha_w, b_v), v=v' \oplus v''$ to be validated. Any validated match will be returned as the solution for SSMP⁻. Otherwise, the algorithm will keep searching.

Figure 10:
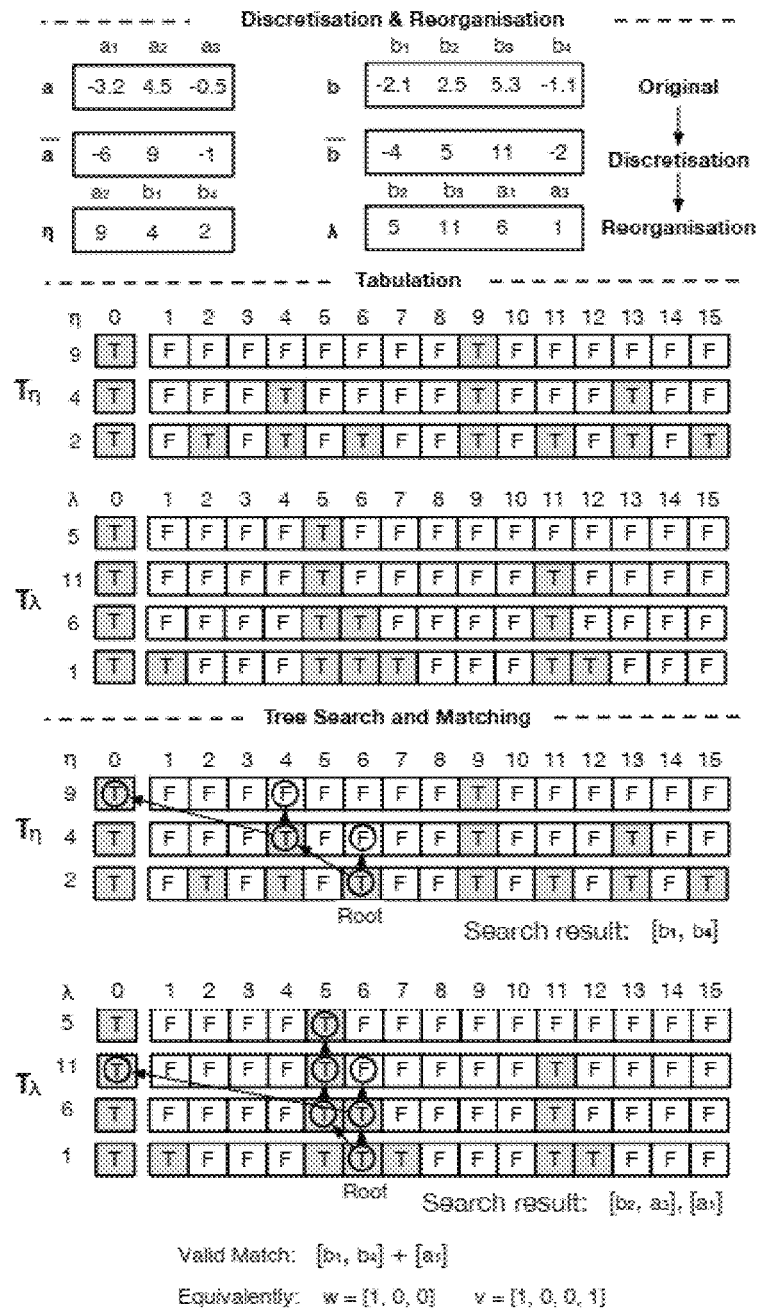
FIG. 10 is an example of how to apply the third algorithm for solving a problem that relates to finding subsets of matching sums of items that are associated with two parties in an efficient and cost-effective manner, according to an exemplary embodiment.

FIG. 9 is a third algorithm 900 that is usable for implementing a method for performing a combinatorial optimization task that relates to finding subsets of matching sums of items that are associated with two parties in an efficient and cost-effective manner, according to an exemplary embodiment. FIG. 10 is an example 1000 of how to apply the third algorithm for solving a problem that relates to finding subsets of matching sums of items that are associated with two parties in an efficient and cost-effective manner, according to an exemplary embodiment.

Dynamic Programming Solver for SSMP⁻: Dynamic programming (DP) for SSMP⁻ is a pseudo-polynomial solver. Like the search-based approach, this DP solver is also a method for finding potential matches and then validating the matches in a post-hoc manner. This algorithm involves three stages: 1) discretization and element reorganization to form a proxy integer problem; 2) tabulation, i.e. building DP tables; and 3) backtracking tables until a valid match is found. The DP solver is shown in algorithm 900, and FIG. 10 is an illustration 1000 of the algorithm with an example.

Discretization and Element Reorganization: Variables $\overline{\alpha}=[\overline{\alpha}_1, \ldots, \overline{\alpha}_M]$ and $\overline{b}=[\overline{b}_1, \ldots, \overline{b}_N]$ are used to represent the elements of $\alpha, b$ after applying discretization $\overline{\alpha}=\text{round}(\rho\alpha)$, $\overline{b}=\text{round}(\rho b)$, where $\rho>0$ is a scale. Then, all the elements are reorganized in $\overline{\alpha}, \overline{b}$ into two groups of positive integers:

$$\eta = [\overline{a}:\overline{a} > 0, a \in \overline{a}] \oplus [-\overline{b}:\overline{b} < 0, \overline{b} \in \overline{b}] \quad \text{(Expression 17)}$$

$$\lambda = [-\overline{a}:\overline{a} < 0, a \in \overline{a}] \oplus [\overline{b}:\overline{b} > 0, \overline{b} \in \overline{b}] \quad \text{(Expression 18)}$$

The variables $\eta$ and $\lambda$ are used to form a new problem SSMP⁻($\eta, \lambda, \in^-$), where each element in q and corresponds to one and only one element in $\alpha$ or b. Let M'=|$\eta$| and N'=|$\lambda$|, this yields M'+N'=M+N. The new matching threshold $\in^-$ is chosen to be the smallest integer that guarantees every solution of the original SSMP⁻($\alpha, b, \in$) can be recovered from a solution of SSMP⁻($\eta, \lambda, \in^-$). $\in^-$ is defined as:

$$\in^- = \lceil \rho\in + (M+N)/2 \rceil \quad \text{(Expression 19)}$$

where $\rho\in$ is a scaled-up item of E and (M+N)/2 is the maximum effect caused by the rounding function.

Tabulation: Two tables $T_\eta, T_\lambda$ are created for storing the feasibility of achieving a certain subset sum from elements in $\eta, \lambda$ respectively. Taking $T_\eta$ as an example, the number of rows is equal to M' while the number of columns is X+1 where X is the largest subset value that can be matched across sides, i.e., $X=\min(\Sigma_{m'=1}^{M'}\eta^{m'}, \Sigma_{n'=1}^{N'}\lambda_{n'})$. Each entry $T_\eta[m', i]$ represents whether the subset sum i can be computed with the first m' elements in $\eta$(m'∈[1,M'],i∈[0,X]). The table is updated with:

$$T_\eta[m', i] = \begin{cases} \text{false if } m' = 1 \text{ and } i \neq \eta_1 \\ \text{true if } i = \eta_{m'} \text{ or } i = 0 \\ T_\eta[m'-1, i] \vee T_\eta[m'-1, i-\eta_{m'}] \text{ o.w.} \end{cases} \quad \text{(Expression 20)}$$

Tree Search and Matching: With the tables $T_\eta, T_\lambda$, the matching procedure compares the last row of each table to find the matched subset sums within tolerance $\in^-$:

$$\mathcal{H} = \mathcal{H}_0 \cup \mathcal{H}_1 \cup \cdots \cup \mathcal{H}_{\overline{\in}} \quad \text{(Expression 21)}$$

where $$\mathcal{H}_e = \{(i, j): T_\eta[M', i] \wedge T_\lambda[N', j] = \text{true}, |i - j| = e\} \quad \text{(Expression 22)}$$

Each (i,j) satisfying this condition would lead to at least one subset in ($\eta, \lambda$) whose sum is equal to (i, j). The corresponding subset(s) can be discovered by back-tracking in the table via a binary search tree. These binary search trees start with the root node located in the last row of the DP table and follow Expression (20) in the reverse direction; for a tree node $T_\eta[m', x]$, if its value is true, then $T_\eta[m'-1, x]$, $T_\eta[m'-1, x-\eta_{m'}]$ are its two child nodes, if it exists. A pruning rule is used to terminate searching that branch when: 1) the value of a node is false; or 2) the column index of the node in the table is zero (0).

FIG. 10 shows examples of binary trees. The search path leading to each leaf node whose value is true uniquely links to a subset corresponding to the target subset sum.

For each pair (i,j)∈H, a binary tree search starting at $T_\eta[M', i]$ and $T_\lambda[N', j]$ brings two groups of subsets and each combination between the two groups, denoted as $(\eta_p \lambda_q)$. $p \in \{0,1\}^M$ and $q \in \{0,1\}^N$ are the vectors for describing subsets of $\eta$ and $\lambda$, which uniquely link to a potential match $(\alpha_w, b_v)$, by reversing the reorganization process, to the original SSMP⁻($\alpha, b, \in$).

Referring to FIG. 10, an illustration 100 of the DP approach with the same example as shown in FIG. 8 is provided. Discretization and Element Reorganization: In this example, converting real numbers to integers via $\rho=2$. Tabulation: Two tables are created from $\eta=[9, 4, 2]$, $\lambda=[5, 11, 6, 1]$. Tree Search and Matching: An example of a tree structure is shown. The first tree with root node $T_\eta[3,6]$ returns one subset of q which links to $[b_1, b_4]$. The tree starting from $T_\lambda[4,6]$ returns 2 subsets of $\lambda$ linking to $[b_2, \alpha_3]$ and $[\alpha_1]$. After validation, only the combination of $[b_1, b_4]$ and $[\alpha_1]$ makes a valid match. Equivalently, w=[1,0, 0], v=[1, 0, 0, 1].

Accordingly, with this technology, an optimized process for performing a combinatorial optimization task that relates to finding subsets of matching sums of items that are associated with two parties in an efficient and cost-effective manner is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing a combinatorial optimization task that relates to finding matching subsets among items that are associated with two parties, the method being implemented by at least one processor, the method comprising:

receiving, by the at least one processor, a first set of data items that relate to respective characteristics of a first situation;

receiving, by the at least one processor, a second set of data items that relate to respective characteristics of a second situation, a number of items included in the second set of data items being at least as great as a number of items included in the first set of data items;

dividing, by the at least one processor, the second set of data items into a first subset and a second subset;

generating, by the at least one processor based on the first subset, a first set of subset sums, and storing the first set of subset sums as a list;

generating, by the at least one processor based on the second subset, a second set of subset sums, and storing the second set of subset sums as a hash-map in conjunction with a corresponding hash function; and detecting, by the at least one processor based on the first set of data items, the list, and the hash-map, at least one match between a subset sum that corresponds to the second set of data items and a subset sum that corresponds to the first set of data items,
wherein the first situation relates to a first set of records that is associated with a first party from among the two parties, and the second situation relates to a second set of records that is associated with a second party from among the two parties, and the detecting of the at least one match comprises performing a reconciliation task as between the first set of records and the second set of records in order to confirm consistency and completeness and to detect at least one from among potential fraudulent activity and potential error.

2. The method of claim 1, further comprising selecting a value for a matching threshold,
wherein the detecting of the at least one match comprises determining whether a difference between the subset sum that corresponds to the second set of data items and the subset sum that corresponds to the first set of data items is less than the selected value for the matching threshold.

3. The method of claim 1, further comprising validating the detected at least one match.

4. The method of claim 1, wherein the dividing comprises:
selecting a natural number between zero and the number of items included in the second set of data items as a split point; and
dividing the second set of data items into the first subset and the second subset such that a vector concatenation of the first subset with the second subset is equal to the selected split point.

5. The method of claim 4, wherein a number of elements of the first set of subset sums stored as the list is equal to two raised to a power that is equal to the selected split point.

6. The method of claim 4, wherein a number of elements of the second set of subset sums stored as the hash-map is equal to two raised to a power that is equal to a difference between the number of items included in the second set of data items and the selected split point.

7. The method of claim 1, wherein the detecting comprises applying a search algorithm that determines at least one element of the second set of subset sums as satisfying a predetermined equation, identifies a set of keys that corresponds to the determined at least one element, and searches the hash-map for the identified set of keys, and
wherein the at least one match is generated as an output of the search algorithm.

8. A computing apparatus for performing a combinatorial optimization task that relates to finding matching subsets among items that are associated with two parties, the computing apparatus comprising:
a processor;
a memory; and
a communication interface coupled to each of the processor and the memory,
wherein the processor is configured to:
receive, via the communication interface, a first set of data items that relate to respective characteristics of a first situation;
receive, via the communication interface, a second set of data items that relate to respective characteristics of a second situation, a number of items included in the second set of data items being at least as great as a number of items included in the first set of data items;
divide the second set of data items into a first subset and a second subset;
generate, based on the first subset, a first set of subset sums, and store the first set of subset sums in the memory as a list;
generate, based on the second subset, a second set of subset sums, and store the second set of subset sums in the memory as a hash-map in conjunction with a corresponding hash function; and
detect, based on the first set of data items, the list, and the hash-map, at least one match between a subset sum that corresponds to the second set of data items and a subset sum that corresponds to the first set of data items,
wherein the first situation relates to a first set of records that is associated with a first party from among the two parties, and the second situation relates to a second set of records that is associated with a second party from among the two parties, and the detecting of the at least one match comprises performing a reconciliation task as between the first set of records and the second set of records in order to confirm consistency and completeness and to detect at least one from among potential fraudulent activity and potential error.

9. The computing apparatus of claim 8, wherein the processor is further configured to select a value for a matching threshold, and to detect the at least one match by determining whether a difference between the subset sum that corresponds to the second set of data items and the subset sum that corresponds to the first set of data items is less than the selected value for the matching threshold.

10. The computing apparatus of claim 8, wherein the processor is further configured to validate the detected at least one match.

11. The computing apparatus of claim 8, wherein the processor is further configured to divide the second set of data items by:
selecting a natural number between zero and the number of items included in the second set of data items as a split point; and
dividing the second set of data items into the first subset and the second subset such that a vector concatenation of the first subset with the second subset is equal to the selected split point.

12. The computing apparatus of claim 11, wherein a number of elements of the first set of subset sums stored as the list is equal to two raised to a power that is equal to the selected split point.

13. The computing apparatus of claim 11, wherein a number of elements of the second set of subset sums stored as the hash-map is equal to two raised to a power that is equal to a difference between the number of items included in the second set of data items and the selected split point.

14. The computing apparatus of claim 8, wherein the processor is further configured to detect the at least one match by applying a search algorithm that determines at least one element of the second set of subset sums as satisfying a predetermined equation, identifies a set of keys that corresponds to the determined at least one element, and searches the hash-map for the identified set of keys, and
wherein the at least one match is generated as an output of the search algorithm.

15. A non-transitory computer readable storage medium storing instructions for performing a combinatorial optimization task that relates to finding matching subsets among items that are associated with two parties, the storage medium comprising executable code which, when executed by a processor, causes the processor to:

receive a first set of data items that relate to respective characteristics of a first situation;

receive a second set of data items that relate to respective characteristics of a second situation, a number of items included in the second set of data items being at least as great as a number of items included in the first set of data items;

divide the second set of data items into a first subset and a second subset;

generate, based on the first subset, a first set of subset sums, and store the first set of subset sums as a list;

generate, based on the second subset, a second set of subset sums, and store the second set of subset sums as a hash-map in conjunction with a corresponding hash function; and detect, based on the first set of data items, the list, and the hash-map, at least one match between a subset sum that corresponds to the second set of data items and a subset sum that corresponds to the first set of data items, wherein the first situation relates to a first set of records that is associated with a first party from among the two parties, and the second situation relates to a second set of records that is associated with a second party from among the two parties, and the detecting of the at least one match comprises performing a reconciliation task as between the first set of records and the second set of records in order to confirm consistency and completeness and to detect at least one from among potential fraudulent activity and potential error.

16. The storage medium of claim 15, wherein when executed by the processor, the executable code further causes the processor to select a value for a matching threshold, and to detect the at least one match by determining whether a difference between the subset sum that corresponds to the second set of data items and the subset sum that corresponds to the first set of data items is less than the selected value for the matching threshold.

17. The storage medium of claim 15, wherein when executed by the processor, the executable code further causes the processor to validate the detected at least one match.

18. The storage medium of claim 15, wherein when executed by the processor, the executable code further causes the processor to divide the second set of data items by:

selecting a natural number between zero and the number of items included in the second set of data items as a split point; and dividing the second set of data items into the first subset and the second subset such that a vector concatenation of the first subset with the second subset is equal to the selected split point.

* * * * *